United States Patent [19]

Malatesta et al.

[11] Patent Number: 4,629,766

[45] Date of Patent: Dec. 16, 1986

[54] PRODUCTION OF HYDROFINED HYDROCARBON RESINS

[75] Inventors: Alberto Malatesta; Bernard Bossaert, both of Brussels, Belgium; Jacques Mourand, Notre Dame-de-Gravenchon, France

[73] Assignee: Exxon Research & Engineering Co., Florham Park, N.J.

[21] Appl. No.: 744,871

[22] Filed: Jun. 13, 1985

Related U.S. Application Data

[63] Continuation of Ser. No. 451,777, Dec. 21, 1982, abandoned.

[30] Foreign Application Priority Data

Dec. 21, 1981 [GB] United Kingdom ............... 8138412

[51] Int. Cl.$^4$ .............................................. C08F 8/04
[52] U.S. Cl. .................................... 525/222; 525/232; 525/333.7; 525/339
[58] Field of Search .................... 525/339, 333.7, 222, 525/232

[56] References Cited

U.S. PATENT DOCUMENTS

| | | | |
|---|---|---|---|
| 3,932,563 | 1/1976 | Argurio et al. | 525/222 |
| 4,022,850 | 5/1977 | Booth et al. | 525/211 |
| 4,328,090 | 5/1982 | Stuckey, Jr. et al. | 502/220 |

*Primary Examiner*—Joseph L. Schofer
*Assistant Examiner*—Bernard Lipman
*Attorney, Agent, or Firm*—J. F. Hunt

[57] ABSTRACT

An improved method for making hydrogenated petroleum resins by subjecting the resin to hydrogenation in the presence of a sulfided nickel (2 to 10 wt. %)—tungsten (10 to 25 wt. %) catalyst supported on a gamma-alumina having fresh catalyst surface area ranging from 120 to 300 m$^2$/g under a hydrogen pressure of 150 to 200 atmospheres and at a temperature in the range 250° C. to 330° C. and the resins so produced.

6 Claims, No Drawings

PRODUCTION OF HYDROFINED HYDROCARBON RESINS

This is a continuation of application Ser. No. 451,777, filed Dec. 21, 1982, now abandoned.

The present invention relates to a process for making light-coloured petroleum resins from fractions of distillates derived from petroleum cuts that have undergone steam cracking, as well as resins displaying the above characteristics.

More particularly, this invention relates to the hydrogenation and decolorization of a hydrocarbon resin prepared by the thermal or catalytic polymerization of olefine and diolefine containing streams.

It is known that from steam cracked petroleum distillate fractions, having boiling points within the range 20° to 280° C., it is possible to prepare resins of medium to high softening point by thermal or catalytic polymerization carried out at a temperature of, for preference between 160° and 320° C., at a pressure for preference between 10 and 30 atmospheres; the polymer obtained is freed of solvent and unreacted monomers generally at a temperature between 220° and 350° C., with or without the injection of superheated steam.

Although the resins thus obtained have some interesting properties, they have the disadvantage of a rather dark colour. These resins have the further disadvantage that they are thermally and oxidatively unstable, i.e., they are chemically reactive.

U.S. Pat. Nos. 2,824,860; 2,911,395 and 3,040,009 and United Kingdom Pat. No. 1,202,802 teach that it is possible to obtain resins with a high softening point and pale colour, by subjecting a resin obtained by thermal polymerization from steam cracked petroleum distillate fractions preferably having a boiling point between 20° and 280° C., to catalytic hydrogenation, said fractions usually being of compounds having one or more unsaturated cyclic rings in the molecule, such as cyclodienes, cycloalkenes, and indenes. United Kingdom Pat. No. 1176443 also describes the hydrogenation of resins produced by polymerisation, preferably catalytic polymerisation of unsaturated hydrocarbons at least 50 wt % of which are aromatic olefines, cyclic monoolefines or cylic diolefines.

The hydrogenation catalysts used in these Patents include nickel, reduced nickel, molybdenum sulphide, with a preferred catalyst being a pre-activated catalyst on a kieselguhr support containing about 58% by weight of nickel, the specific area being about 140 m$^2$/g and the ratio: reduced nickel to total nickel equal to about 0.66 suitable proportions of catalyst are from 2 to 20% by weight, and for preference from 7 to 13% by weight, in relation to the resin.

Before carrying out hydrogenation, the thermally polymerized resin is preferably dissolved in a saturated hydrocarbon solvent such as heptane. Hydrogenation can take place in a single stage at a temperature of 200° to 260° C. and for preference from 210° to 230° C., at a pressure of 20 to 120 atmospheres, and for preference from 30 to 90 atmospheres for a period of 5 to 7 hours. After filtering off the catalyst, the solvent is removed by distillation and recovered for recycling.

In this way is obtained, with a yield generally in the order of 90-95% (in relation to the thermal resin treated), a hydrogenated resin characterised by a Saybolt colour in the region of 25, a softening point in the region of 150° to 180° C., and a bromine number in the region of 1 to 3.

In the production of these resins, the amount produced is limited particularly by the feed throughput and catalyst lifetime. Furthermore there is a need for resins having a further improvement in colour.

Accordingly, in view of the above, the need has existed for an improved process providing for increased yield of hydrocarbon resins of quality comparable or superior to that produced by the prior art processes and in addition, operating with catalysts and process conditions resulting in longer run lengths.

In our European patent application no. 81303319.8 we describe the use of a sulfided nickel-tungsten catalyst on an alumina support having a specific fresh surface area ranging from 120 to 300 m$^2$/g and containing from 2 to 10% by weight nickel and from 10 to 25% by weight tungsten, for the hydrogenation of petroleum resins. It is also suggested that the hydrogenation be effected at a temperature of 200° to 320° C. and a pressure of 20 to 300 atmospheres, preferably 30 to 50 atmospheres.

We have now found that the yields and purity of the hydrogenated polymers obtained using the catalyst system of our European application may be significantly improved if the hydrogenation is carried out using hydrogen pressures in the range 150 to 200 Atmospheres and temperatures between 250° and 330° C., preferably between 300° and 320° C.

The present invention therefore provides a process for the hydrogenation of petroleum resins in which resin is subjected to catalytic hydrogenation using a hydrogenation catalyst comprising a sulfided nickel-tungsten catalyst on a gamma-alumina support having a fresh catalyst surface area ranging from 120 to 300 m$^2$/g and containing from 2 to 10% by weight nickel and from 10 to 25% by weight tungsten respectively wherein the hydrogenation is effected at a temperature in the range 250° to 330° C. and at a hydrogen pressure of 150 to 200 atmospheres.

The petroleum resin obtained by the process of the present invention is typically characterized by Saybolt colours of above 20 generally between 20 and 30+, a softening point in the region of 50° to 150° C., a bromine number about 0 and an improved thermal colour stability as measured in the Saybolt scale (ASTM D 156 using a 10 wt % resin solution in toluene).

These petroleum resins also have outstanding properties as tackifiers in adhesive formulations. These resins can find a large number of applications, in particular, in adhesive products as pressure or hot melt adhesives. Compared with the terpene resins that are commonly used, they have better adhesive properties, a better colour and better ageing properties.

The polymerization of the petroleum fraction to produce the resin is carried out thermally or catalytically, generally in an oxygen-free atmosphere. Polymerisation of the $C_5$ and/or $C_6$ olefine and/or diolefine streams whether or not cyclic may be effected thermally or catalytically. Thermal polymerisation is usually at a temperature from 160° to 320° C., e.g., at about 250° C., at a pressure of 10 to 12 atmospheres, e.g., at 10 atmospheres, for a period of from 0.5 to 9 hours, typically 1.5 to 4 hours. Streams containing $C_8$/$C_9$ aromatic olefines such as styrene, vinyl aromatics such as vinyl benzene and optionally indene are generally polymerised catalytically, usually with a Friedel-Crafts catalyst such as aluminium trichloride These polymerizations may be batch, semi-batch or continuous.

The polymeric resin so produced is dissolved in an inert, predominantly saturated hydrocarbon solvent, such as Varsol (Registered Trade Mark) or base white spirit in proportions varying from 10 to 60% and preferably in the region of 20% by weight polymer. It is then subjected to hydrogenation under the conditions of the present invention whereby the colour is reduced to a water-white colour of Saybolt colour greater than 20 generally greater than 28.

Hydrogenation can take place in an autoclave or a continuous reactor. In the case of a continuous reactor the hydrogenation is usefully carried out by means of a fixed catalyst bed with the feed flow being either upflow or downflow liquid phase or trickle bed operation. The hydrogenation reaction is exothermic and some of the heat generated is removed from the reactor with the product and the quoted temperature 250° C. to 330° C. is the maximum during hydrogenation, preferably this is 270° .C. to 320° C. The hydrogenation pressure is a function of the hydrogen purity and the overall reaction pressure should be higher if the hydrogen contains impurities to give the desired hydrogen pressure.

After hydrogenation, the mixture from the reactor may be flashed and further separated to recover the solvent and hydrogen for recycle and to recover the hydrogenated resin. The resin solution is flashed and/or distilled in an oxygen free or minimum oxygen atmosphere to eliminate the solvent, and thereafter may be steam distilled to eliminate oligomers, known in the trade by the name of "fill", preferably with care not to raise the temperature of the resin above 325° C. to avoid degrading the colour and other properties of the finished resin.

The molten resin is conveniently cast and crushed after cooling. Alternately, it may be pastillated, prilled or flaked.

Resins are thus obtained having a Saybolt colour of 20 to 30+, a bromine number of zero, a ball-ring softening point of about 50° to 150° C. and a high degree of tackiness. These properties, together with others such as brilliance, compatibility with other resins, and solubility in usual solvents, enable them to be used in making many products used in varied industries; viz., tackifiers for adhesives of all kinds, such as hot melt adhesives, pressure sensitive additives, hot melt pressure sensitive adhesives, adhesive emulsions, where they are mixed in the normal proportion with natural or synthetic rubbers, the polymers such as ethylene vinyl acetate copolymers and waxes tradditionally used in such adhesive formulations. They may also be used as ink resins and as components in varnishes and paints, and for the treatment of cellulose materials.

The process of the invention preferably uses a hydrodesulphurization catalyst prepared by impregnating the oxides of nickel and tungsten onto an alumina support, preferably a high surface area alumina such as alpha alumina. The preferred components are nickel and tungsten on a gamma alumina support. The concentration of metals on the catalyst is important for good performance and ranges from 2 to 10, preferably 4 to 5, weight percent nickel and from 10 to 25, preferably 16 to 20, weight percent tungsten. The pore size distribution of the alumina support is also important to the performance of the catalyst. The catalyst is so prepared that the pore volume of the small pores in the 15–300 Angstrom radius range is less than 70% of the total pore volume whereas the large pores or channels having radii in the range of 10,000 to 75,000 A are at least 10% of the total pore volume between 10 and 75,000 A. This results in a fresh catalyst surface area of the support typically in the range 120–300 $m^2/g$. Notwithstanding, these extensive large pores the catalyst has sufficient mechanical strength. In adhering to these criteria for pore size distribution and metals loading a high performance and optimum catalyst for the processs of the invention is realized.

The catalyst used in the Examples of the present invention had the following properties.

TABLE I

|  | Preferred Range | | Produced Catalysts | | |
|---|---|---|---|---|---|
|  | Minimum | Maximum | A | B | C |
| Loss on ignition (at 600° C.) wt. % | — | 3.0 | — | 0.37 | 0.5 |
| Chemical Analyses, wt. % Basis: Finished Catalyst Dried 3 Hours at 1,000° F. | | | | | |
| $WO_3$ | 18.0 | 22.7 | 21.3 | 19.6 | 20.2 |
| NiO | 3.5 | 6.0 | 4.8 | 5.4 | 5.6 |
| $SiO_2$ | — | 2.0 | 0.1 | 0.27 | 0.3 |
| $Na_2O$ | — | 0.2 | 0.73 | 0.04 | 0.03 |
| $SO_4$ | — | 2.0 | 2.6 | 0.75 | 1.1 |
| $Fe_2O_3$ | — | 0.1 | 0.03 | 0.01 | 0.08 |
| α-Alumina | balance | balance | balance | balance | balance |
| Physical Properties | | | | | |
| Total Surface Area, $m^2/g^{(4)}$ | 160 | 240 | 224 | 201 | 181 |
| Average Pellet Diameter, inches[3] | 0.055 | 0.07 | 5/64 | 0.065 | 0.067 |
| Average Length, inches[3] | 0.125 | 0.250 | 0.195 | 0.204 | 0.20 |
| Average Crushing Strength, lbs/118" anvil length[1] | 6.5 | 12 | 7.1 | 11.6 | 8.4 |
| Abrasion Loss. % per ½ hour | — | 7.0 | 3.1 | 2.2 | 5.0 |
| Pore Volume, cc/g, 15–75,000Å Radius[5] | 0.44 | 0.69 | 0.48 | 0.52 | 0.57 |
| Pore Size Distribution[2] | | | | | |
| 0–100Å Radius cc/g | 0.30 | 0.45 | 0.33 | 0.37 | 0.36 |
| 100–1,000Å Radius cc/g | 0.04 | 0.13 | 0.08 | 0.09 | 0.09 |
| 1,000–10,000Å Radius cc/g | 0.03 | 0.08 | 0.13/0.11 | 0.04 | 0.06 |
| 10,000–75,000Å Radius cc/g | 0.02 | 0.07 | 0.03 | 0.006/0.014 | 0.06 |
| Total Pore Volume Å cc/g | 0.44 | 0.69 | 0.56 | 0.50 | |
| 1,000–75,000Å Radius cc/g | | | | | |

TABLE I-continued

|  | Preferred Range | | Produced Catalysts | | |
|---|---|---|---|---|---|
|  | Minimum | Maximum | A | B | C |
| Percent through 16 Mesh, wt. % | — | 0.6 | | | |

[1] Number average using 25 randomly selected extrudates - calcined prior to the crush test at 850° F. for one hour.
[2] 0–300Å Radius by nitrogen absorption 300–75,000Å Radius by mercury porosimeter. Use 140° for mercury contact angle and 474 dynes/cm as the surface tension of mercury.
[3] Number average using 100+ extrudates.
[4] Determined by BET method using nitrogen as adsorbate.
[5] By summation of (a) the pore volume for pores of 15–300Å radius by nitrogen adsorption and (b) the pore volume for pores of 300–75,000Å radius by mercury porosimetry.

The resin feed used in these Examples was a solution of a thermally polymerised hydrocarbon resin of 85° C.–150° C. softening point obtained by polymerising a feed stream containing 60 to 70 wt % polymerisable monomers comprising substituted and unsubstituted $C_5$ cyclic olefins and $C_{10}$ bicyclic diolefines, the remainder being inert aromatics such as benzene, and toluene at for 250° C.–300° C. under autogenous pressure. The solvent was VARSOL (Registered Trade Mark) being a paraffinic solvent containing 20 wt. % aromatics and boiling from 150° C. to 190° C.

In these Examples the time of hydrogenation, the concentration of the resin feed in the solvent and the hydrogen pressure were varied. The yield of hydrogenated resin, the maximum exotherm achieved during the reaction, the Saybolt colour and heat stability of the hydrogenated resin, its softening point and its bromine number were measured. A further run was carried out for comparison in which hydrogenation was effected at 40 atmospheres pressure. The results are given in the following table.

TABLE

| Time of hydrogenation Hrs | Wt % Resin in feed | Hydrogen Pressure (Atm) | Exotherm Max. T °C. | Resin yield % | Colour Saybolt (1) | Softening Point °C. | Bromine No | Heat (2) stability Saybolt |
|---|---|---|---|---|---|---|---|---|
| 15 | 26.33 | 40 | 289 | 76 | 24 | 120 | 1 | −6 |
| 77 | 33.60 | 180 | 312 | 78 | 30+ | 119 | 0 | 28 |
| 164 | 33.60 | 200 | 318 | 76 | 30+ | 120 | 0 | 26 |
| 350 | 30.14 | 180 | 313 | 73 | 30+ | 119 | 0 | 27 |
| 33 | 39.83 | 180 | 309 | 73 | 30+ | 126 | 0 | 21 |
| 37 | 39.83 | 180 | 306 | 76 | 30+ | 119 | 0 | 26 |
| 23 | 20.0 | 180 | 303 | — | 30+ | 130 | 0 | 26 |
| 14 | 15.0 | 180 | 299 | — | 30+ | 126 | 0 | 27 |
| 10 | 10.0 | 180 | 295 | — | 30+ | 125 | 0 | 22 |

(1) ASTM D 156 but using 10% resin solution in toluene solvent.
(2) The colour Saybolt after the resin has been heated at 150° C. for 16 hours in an air oven previous addition to the resin of BHT butylated hydroxy toluene.

We claim:

1. A process for the hydrogenation of petroleum resins in which resin is subjected to catalytic hydrogenation using a hydrogenation catalyst comprising sulfided nickel-tungsten on a gamma-alumina support having a fresh catalyst surface area ranging from 120 to 300 $m^2/g$ and containing from 2 to 10% by weight nickel and from 10 to 25% by weight tungsten respectively wherein the hydrogenation is effected at a temperature in the range 250° to 330° C. and at a hydrogen pressure of 150 to 200 atmospheres.

2. A process according to claim 1 in which the petroleum resin is obtained by the thermal or catalytic polymerisation of a $C_5/C_6$ olefine and/or diolefine stream.

3. A process according to claim 1 in which the petroleum resin is obtained by the catalytic polymerisation of a stream containing $C_8/C_9$ aromatic olefines.

4. A process according to claim 1 in which the resin is hydrogenated whilst dissolved in a predominantly saturated hydrocarbon solvent.

5. A hydrogenated petroleum resin whenever produced by a process according to claim 1.

6. An adhesive formulation comprising natural or synthetic rubber or an ethylene vinyl acetate copolymer, and a hydrogenated resin according to claim 5 as an adhesive tackifier.

* * * * *